United States Patent [19]
White et al.

[11] Patent Number: 6,037,743
[45] Date of Patent: Mar. 14, 2000

[54] BATTERY CHARGER AND POWER SOURCE EMPLOYING AN ENVIRONMENTAL ENERGY EXTRACTOR AND A METHOD RELATED THERETO

[76] Inventors: Stanley A. White, 433 E. Avenida Cordoba, San Clemente, Calif. 92672; James W. Johnston, 11 Via Solano, Rancho Santa Margarita, Calif. 92688; P. Michael Henderson, 12450 Butler Way, Tustin, Calif. 92782; Warner B. Andrews, Jr., 754 16th St., Boulder, Colo. 80302; Kenneth S. Walley, 19262 Shadow Oak Dr., Portola Hills, Calif. 91679; Jonathan I. Siann, 12501 Dormouse, San Diego, Calif. 92129

[21] Appl. No.: 09/094,735

[22] Filed: Jun. 15, 1998

[51] Int. Cl.[7] ........................... H01M 10/44; H01M 10/46
[52] U.S. Cl. ........................... 320/103; 320/166; 320/101
[58] Field of Search ..................... 320/101, 102, 320/166, 167; 323/906; 136/291, 292, 293

[56] References Cited

U.S. PATENT DOCUMENTS

| | | | |
|---|---|---|---|
| 3,696,286 | 10/1972 | Ule | 320/101 |
| 4,306,183 | 12/1981 | Wright | 320/101 |
| 5,457,447 | 10/1995 | Ghaem et al. | 323/906 |
| 5,522,943 | 6/1996 | Spencer et al. | 136/291 |

*Primary Examiner*—Peter S. Wong
*Assistant Examiner*—Pia Tibbits
*Attorney, Agent, or Firm*—Price, Gess & Ubell

[57] ABSTRACT

A power source employs an environmental energy extractor. The environmental energy extractor operates to extract energy from the environment and provides the extracted energy either to power an electronic device, or to a storage device coupled to a battery charger for storing the extracted energy. The environmental energy extractor can include one or more energy modules. Each energy module is for extracting environmental energy and for providing the extracted energy to either the electronic device or the storage device. When more than one energy module is employed, the energy modules are configured such that the extracted energy provided by each module is summed, and the collective extracted energy of all the energy modules is provided to the electronic device or the storage device.

45 Claims, 10 Drawing Sheets

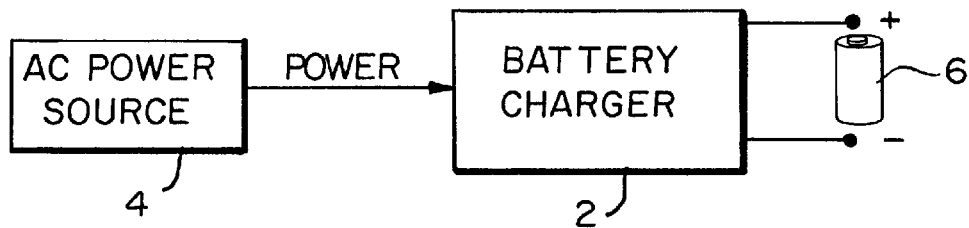
FIG. IA
PRIOR ART
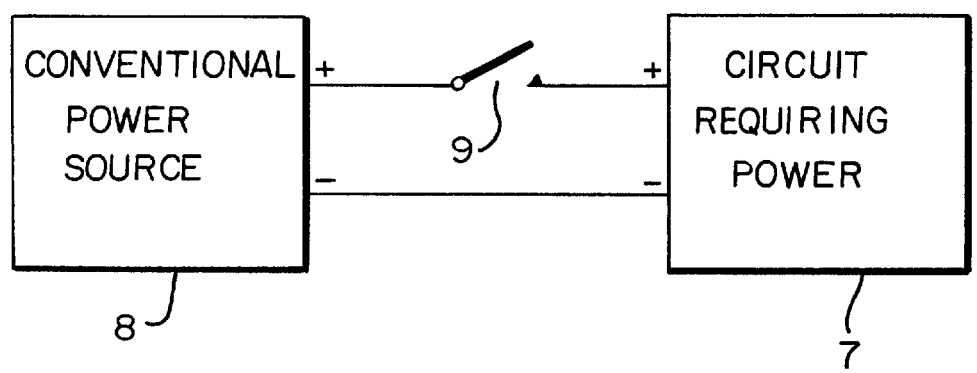
FIG. IB
PRIOR ART

BATTERY CHARGER AND POWER SOURCE EMPLOYING AN ENVIRONMENTAL ENERGY EXTRACTOR AND A METHOD RELATED THERETO

BACKGROUND OF THE INVENTION

1. Field of the Invention

This invention relates generally to power sources, and more specifically to a power source and a battery charger employing an environmental energy extractor and a method related thereto.

2. Background Art

FIG. 1A is a block diagram of a prior art battery charger system 1. The prior art battery charger system 1 includes an AC power source 4 for providing power and a battery charger 2, coupled to the AC power source 4, for charging a battery 6.

Such a system 1 is limited in usefulness because of its dependence on the AC power source 4 for power. For example, if one is in a location where there are no AC power outlets, the battery charger 2 is inoperative.

FIG. 1B is a block diagram of a prior art electronic device 5 that employs a conventional power source 8. Typically, the conventional power source 8 is coupled in parallel to a circuit requiring power 7 via a switch 9. Conventional power sources 8 include AC power sources, DC power sources and batteries, among others. The electronic device 5 cannot operate without the conventional power source 8. Consequently, the electronic device 5 is either tethered to an AC outlet or dependent upon batteries with a limited life. Once the power source fails, the electronic device 5 cannot be operated.

Although the general scientific principle of extracting energy from radio signals is known, previous attempts to extract energy from radio signals and to power devices with the extracted energy have been limited in their success, usefulness, and scope. For example, in the past there have been stunts near radio transmitters where light bulbs have been powered directly from the radio signals that are generated by the radio tower. However, these stunts could only be reproduced when in the vicinity of the radio tower.

Another example of extracting energy from radio signals is the crystal radio receiver. The crystal radio receiver or "crystal set" operates as a radio receiver to receive broadcasts from local radio stations. In addition, the crystal set captures sufficient energy from the radio signals being received to drive a small pair of headphones. Consequently, the crystal set did not require a separate power source for operation. However, the amount of energy extracted is small, and the actual power generated typically was only several micro-watts, which has very limited applications. In fact, the crystal set typically did not have further utility beyond driving the small pair of headphones. Furthermore, in addition to being inefficient in extracting energy from the environment and being limited to extracting only a small amount of energy, the crystal set also suffered from the disadvantage that it could not be used to power another device or to charge a battery or other storage device so that the energy could be used at a later time.

Accordingly, there remains a need for an improved power source and battery charger that overcomes the dependence on an AC source for power and that efficiently captures the energy from the environment, provides the energy to power different electronic devices, and/or charges a battery or other storage device so that the energy could be used at a later time.

SUMMARY OF THE INVENTION

It is therefore an object of the present invention to provide a power source that is not dependent on a conventional power source, such as an AC power source.

It is another object of the present invention to provide a power source having an environmental energy extractor.

It is a further object of the present invention to provide a power source having one or more energy modules and which allows the energy extracted by each energy module to be summed.

It is yet a further object of the present invention to provide a power source that is pre-tuned to receive signals at a single, strongest, predetermined frequency for a specific geographical area.

It is yet a further object of the present invention to provide a power source that is pre-tuned to receive signals at one or more different predetermined frequencies for a specific geographical area.

It is yet a further object of the present invention to provide a power source that dynamically or actively optimizes power extraction in a particular frequency range provided by the user.

In order to accomplish the objects of the present invention, there is provided a battery charger and a related method for extracting energy from the environment. The battery charger includes an environmental energy extractor, a storage device, and a first terminal and a second terminal for receiving a battery.

The present invention also provides a combination which includes a device which requires energy for its operation, and a power source coupled to the device. The power source includes an environmental energy extractor for extracting energy from the environment and for providing the extracted energy to the device.

In accordance with one aspect of the present invention, the battery charger or power source includes a first section with a current path for receiving signals and for maximizing the current in the current path; a second section, inductively coupled to the first section, for maximizing the impedance in the second section, and consequently, the voltage output of the second section; and a third section for rectifying the voltage output of the second section. The first, second and third sections together form an energy module.

In accordance with one aspect of the present invention, when more than one energy module is employed, the battery charger or power source includes a fourth section for selectively isolating each energy module from the remaining modules. The energy modules are configured such that the extracted energy provided by the energy modules are summed and the collective extracted energy of all the energy modules is provided to the storage device or the device which requires energy for its operation.

In accordance with another aspect of the present invention, the fourth section includes a measurement and control circuit for adjusting the first and second sections to actively optimize power extraction in a particular frequency range based upon the module output and a frequency tuning parameter provided by the user.

BRIEF DESCRIPTION OF THE DRAWINGS

The present invention is illustrated by way of example, and not by way of limitation, in the figures of the accompanying drawings and in which like reference numerals refer to similar elements.

FIG. 1A illustrates a prior art battery charger.

FIG. 1B illustrates a prior art electronic device that employs a conventional power source.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known, devices and circuits are omitted so as to not obscure the description of the present invention with unnecessary detail.

The present invention provides a power source and a related method for extracting energy from the environment. The power source includes an environmental energy extractor for extracting energy from the environment. According to one embodiment, the present invention can operate as a battery charger, and includes a storage device, and a first terminal and a second terminal for receiving a battery. The environmental energy extractor provides the extracted energy to the storage device. According to another embodiment, the environmental energy extractor provides the extracted energy to power a device which requires energy for its operation.

When the present invention is in a suitable environment, the present invention is operationally and electrically indistinguishable from a conventional power source, such as a battery. A suitable environment is simply an environment that is rich with environmental energy in the form of transmitted signals.

These transmitted signals include radio-frequency (RF) signals, cellular telephone and pager signals, and air-traffic control signals. Common sources for these signals include radio and television transmitters, cellular telephone and pager transmitters at base stations, and radars (e.g., air-traffic control radars, police radars, and emergency radars).

Since the present invention extracts energy from signals that permeate the environment and converts the energy into electrical power, an absence of these signals disables the present invention. For example, in an area such as the Los Angeles basin or metropolitan New York that is rich with transmitted signals, the present invention operates effectively to extract energy from the environment.

However, the present invention would not operate effectively in an area that is bereft of transmitted signals (i.e., areas where the power-density field strength of the transmitted signals is very low).

Figure 2A:
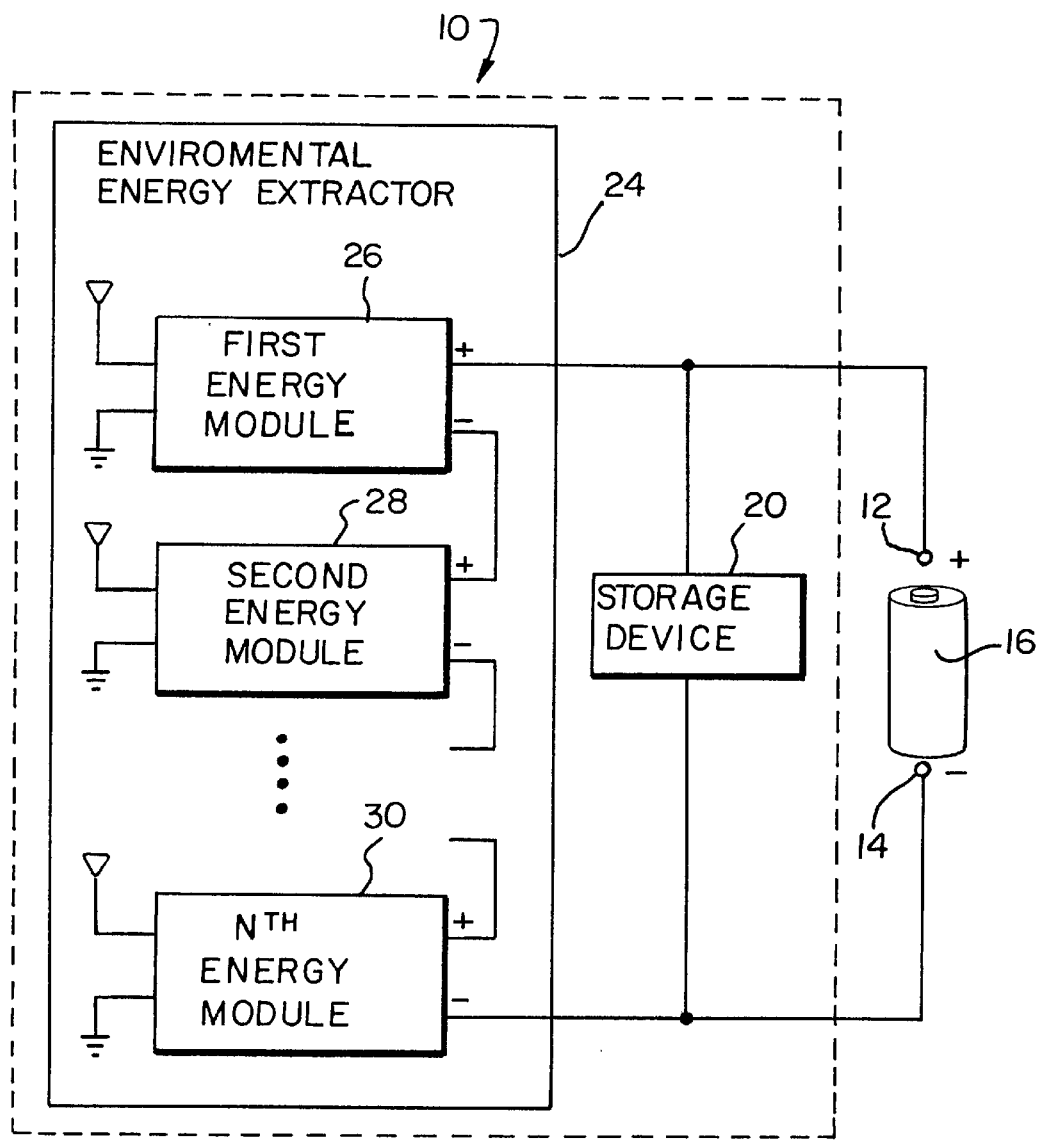
FIG. 2A is a simplified block diagram of the power source configured in accordance with one embodiment of the present invention.

FIG. 2A is a simplified block diagram illustrating the power source 33 of the present invention configured to operate as a battery charger 10. The power source 33 includes a first terminal 12 for receiving an anode of a battery 16 and a second terminal 14 for receiving a cathode of the battery 16. The battery charger 10 further includes a storage device 20 for storing charge. In a preferred embodiment, the storage device 20 can be a capacitor as described hereinafter in FIG. 4.

The power source 33 further includes an environmental energy extractor 24 that is coupled to the first terminal 12 and the second terminal 14. The environmental energy extractor 24 includes one or more energy modules, such as a first energy module 26, a second energy module 28, and a plurality of other energy modules until the $N^{th}$ energy module 30. The number of energy modules can be adjusted to suit a particular application. In the preferred embodiment, there are at least two energy modules. Each module is provided for receiving signals from the environment via an antenna, extracting energy from the signals, and providing the extracted energy to the storage device 20 and the battery 16. When more than one energy module is employed, the energy modules are configured in series so that the extracted energy of all the energy modules is summed. Accordingly, the environmental energy extractor 24 provides an extracted energy equal to the sum of the individual energy contributions of each energy module to the storage device 20 and the battery 16.

Figure 2B:
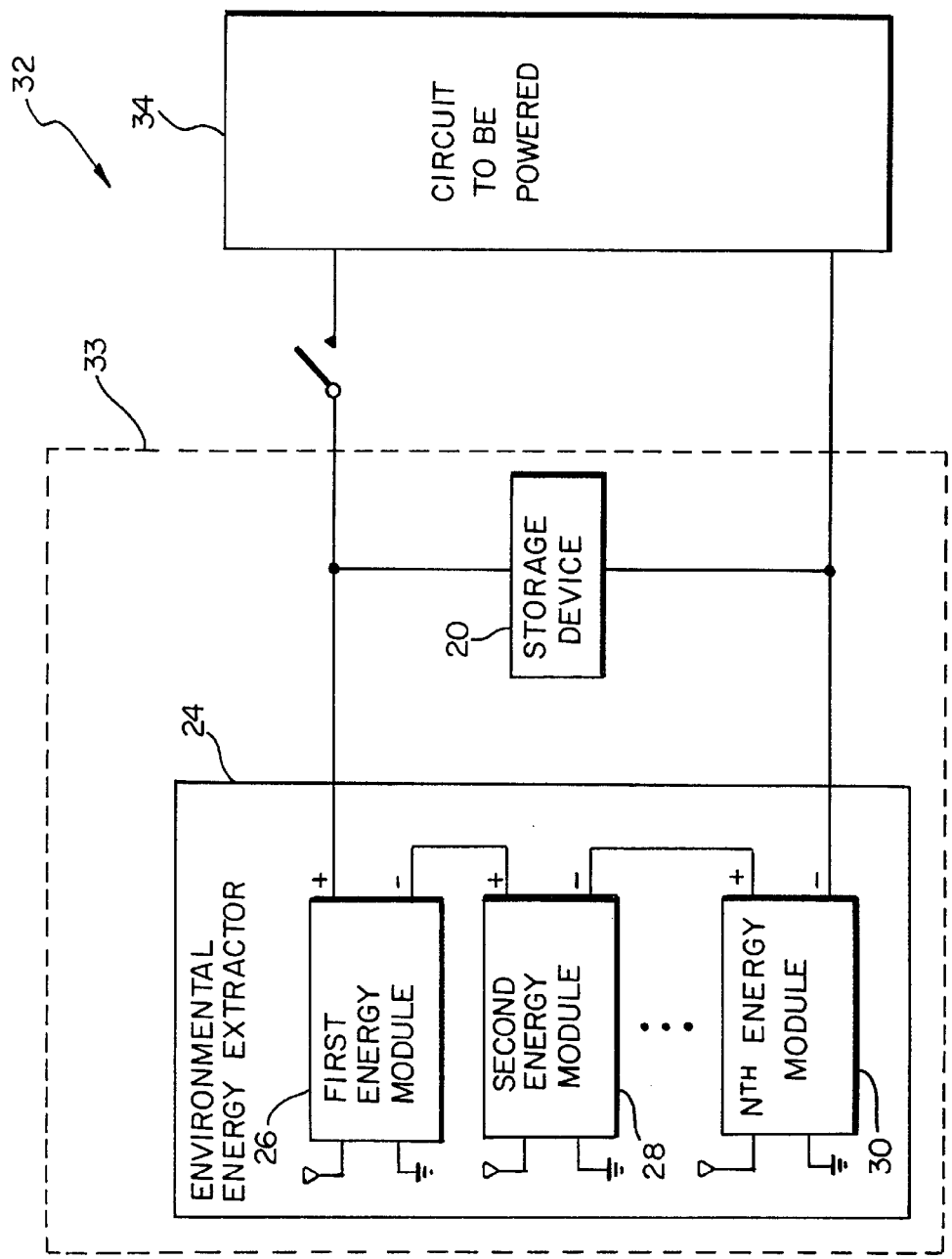
FIG. 2B is a simplified block diagram of the power source configured in accordance with another embodiment of the present invention.

FIG. 2B is a simplified block diagram illustrating an electronic device 32 that employs the power source 33 of the present invention. The power source 33 is configured to power a device 34 that requires power for its operation. The power source 33 includes the environmental energy extractor 24 coupled in parallel with a storage device 20 and a circuit to be powered 34 (i.e., the device 34). Upon activating a switch 35, the power source 33 is connected to provide power to the circuit 34. The energy modules 24, 26 and 30 in FIGS. 2A and 2B can be the same.

This embodiment of the present invention provides the electrical power directly to a device, such as a local device or a mobile device (as defined below), that requires power for operation. For example, the present invention can provide electrical power to an integrated semiconductor device. In this regard, the present invention can act as a primary power source and be integrated with any device that requires power for operation. For example, the present invention can be implemented in a semiconductor device (e.g., CMOS low power devices).

Figure 3:
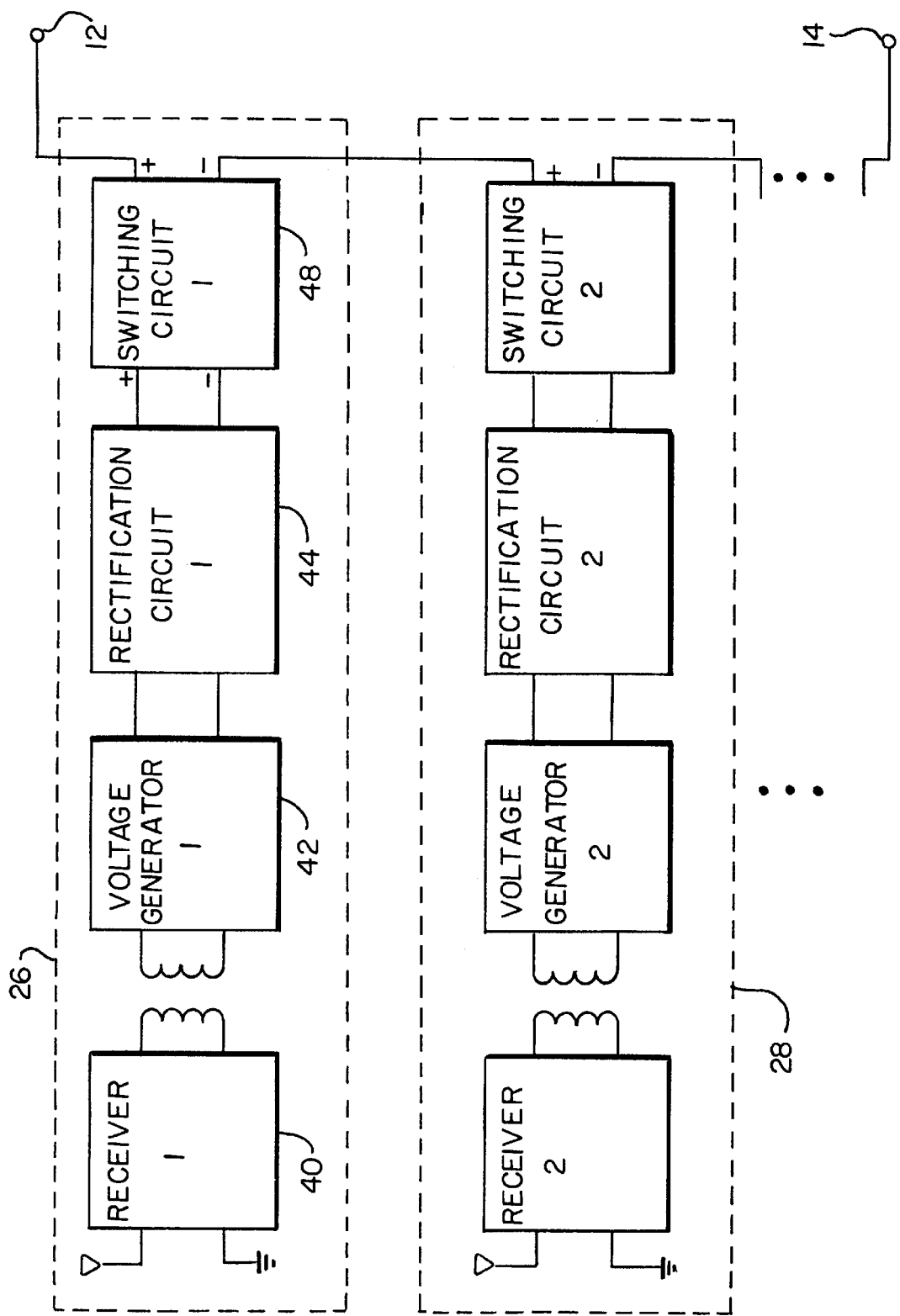
FIG. 3 is a block diagram of the energy modules of FIGS. 2A and 2B.

FIG. 3 is a block diagram illustrating in greater detail the energy modules of FIGS. 2A and 2B. The first energy module 26 includes a receiver_1 40 (hereinafter also referred as the "first section") having a current path. The receiver_1 40 is for receiving signals from the environment and for maximizing a current through the current path. A voltage generator_1 42 (hereinafter also referred as the "second section") is inductively coupled to the receiver_1 40 for generating a voltage output. A rectification circuit_1 44 (hereinafter also referred as the "third section") is coupled to the voltage generator_1 42 for rectifying the voltage output of the voltage generator_1 42. A switching circuit_1 48 (hereinafter also referred as the "fourth section") selectively isolates the first energy module 26 from the other energy modules. Depending on how the switching circuit_1 48 is controlled, the first energy module 26 can be either electrically coupled in series with the other energy modules to contribute to the total extracted energy, or electrically isolated from the other energy modules. The switching circuit_1 48 is described in greater detail hereinafter with reference to FIG. 4.

The second energy module 28 and subsequent modules are configured in a fashion similar to the first module 26. For example, the second energy module 28 includes a receiver_ 2, a voltage generator_2, a rectification circuit_2, and a switching circuit_2, and the $N^{th}$ energy module includes a receiver_N, a voltage generator_N, a rectification circuit_N, and a switching circuit_N. Accordingly, the components of these energy modules will not be described herein for the sake of brevity.

In one embodiment of the present invention, the first and second sections of each energy module can be pre-tuned. The pre-tuning can be to a single predetermined frequency (e.g., the frequency of the strongest transmitted signals for a particular geographical area), or to one or more different predetermined frequencies (e.g., one of the ten highest power signals in the area). This embodiment is best suited for use with local devices.

Local devices are devices that remain in a local geographical area. Local devices include personal computers (PCs) and related peripherals, home electronics, a personal communication set, radios, headphones, tape recorders, and any device that is likely to remain in a local geographical area. For these local devices, a pre-tuned first and second section is preferred. The embodiment of the present invention employing pre-tuned first and second sections is described in greater detail hereinafter with reference to FIG. 4.

In another embodiment of the present invention, the first and second sections of all energy modules are dynamically or actively tuned. The first and second sections of the energy modules can be dynamically tuned to optimize power extraction in a particular frequency range based upon the module output and tuning parameters provided by the user. This embodiment is best suited for use with mobile devices.

Mobile devices are devices that are not local to a geographical area. Mobile devices include cellular telephones, pagers, personal digital assistants (PDAs), and Global Positioning Satellite (GPS) devices, among others. Any portable device that can easily be carried by a user when a user travels can be considered to be a mobile device. For these mobile devices, a dynamically tuned first and second section is preferred. Dynamic tuning of the first and second section is described in greater detail hereinafter with reference to FIGS. 5 and 6.

1. Embodiment Having Pre-Tuned First and Second Sections

Figure 4:
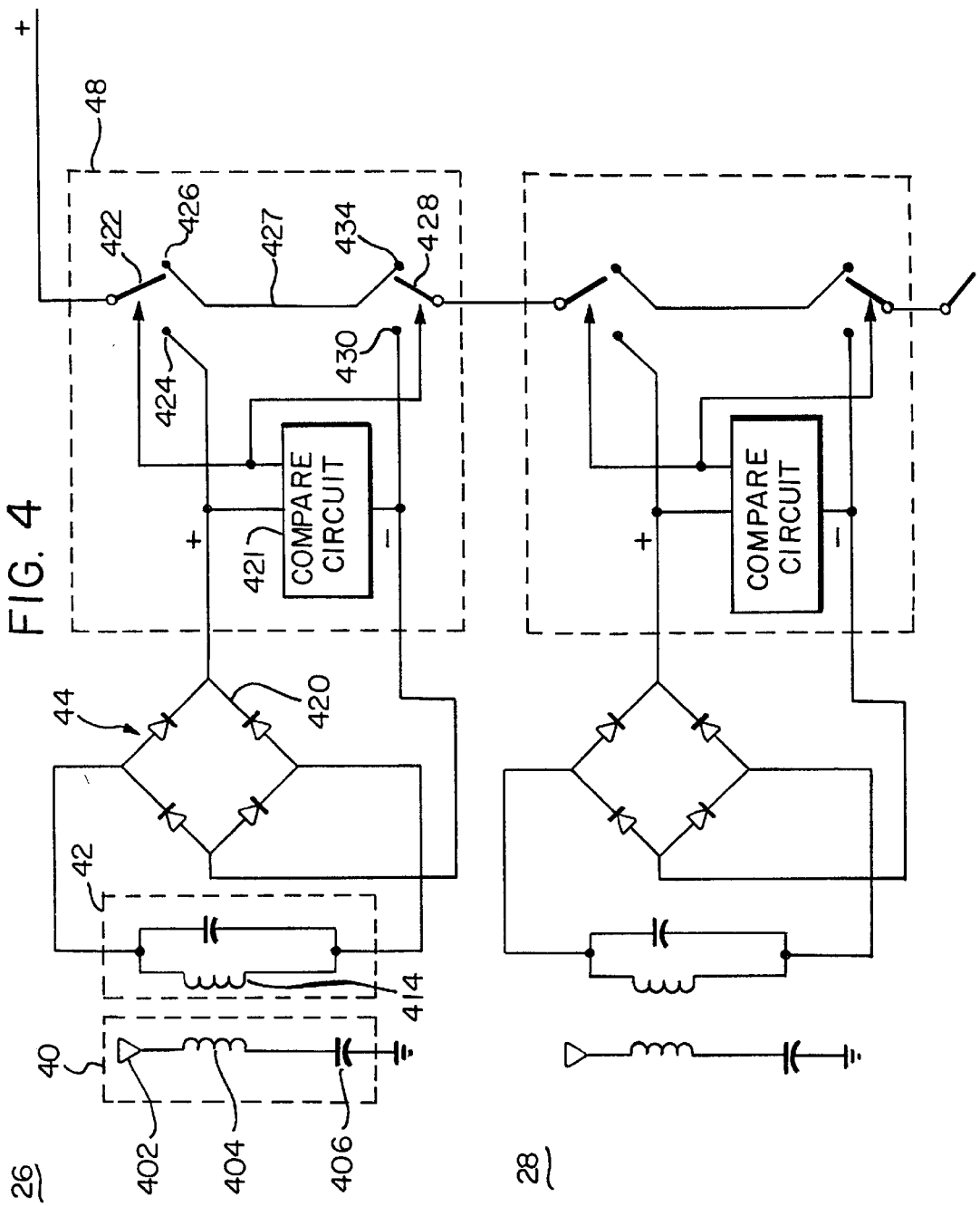
FIG. 4 is a schematic diagram of the first and second energy modules of FIG. 3 configured in accordance with one embodiment of the present invention.

FIG. 4 is a schematic diagram illustrating in greater detail the pre-tuned embodiment of the first energy module 26 and the second energy module 28 of FIG. 3. In this embodiment, the first section 40 includes a current path that is formed by an antenna 402 for receiving transmitted signals, an inductor (L) 404, and a capacitor (C) 406 coupled in series. The first section 40 is tuned to receive signals with a resonant frequency specified by the LC circuit. In a preferred embodiment, the first section 40 is tuned so as to maximize the current through the current path of the first section 40. In another preferred embodiment, the first section 40 is tuned one or more different predetermined frequencies.

The second section 42 is inductively coupled to the first section 40. The second section 42 is preferably electrically isolated at zero frequency from the first section 40 so that the output voltage of each energy module can be summed in series to achieve a higher output voltage. The second section 42 includes an inductor 414 (L) and a capacitor 416 (C) coupled in parallel. The second section 42 maximizes an impedance, and thereby maximizes the output voltage of the second section 42. The second section 42 inductively couples the energy from the first section 40 and multiplies the voltage with a high Q impedance to provide the output voltage.

The third section 44 is for performing rectification of the output voltage of the second section 42. In the preferred embodiment, a floating full wave rectifier 420 is connected across the parallel LC circuit of the associated second section 42 for rectifying the output voltage of the second section 42. Although a half-wave rectifier can be employed in place of the full-wave rectifier, full-wave rectification of the signal increases the power output of the energy module. In other words, the use of a full-wave rectifier 420 by the present invention further maximizes the extraction of energy.

A fourth section 48 includes a compare circuit 421 and circuits for interconnecting the energy modules so as to selectively sum the outputs of the energy modules. The circuit for interconnecting the energy modules can be implemented with a two-switch configuration that selectively enables an energy module to be switched into and out of a series connection with the other energy modules. Accordingly, the switches can be controlled to boost the output voltage by connecting one or more of the energy modules in series.

In particular, the circuit for interconnecting the energy modules includes a first switch 422 having a first position 424 and a second position 426, and a second switch 428 having a first position 430 and a second position 434. When the first switch 422 and second switch 428 are in the first position (424 and 430), the energy module voltage output is in series with the previous and next energy modules. When the first switch 422 and second switch 428 are in the second position (426 and 434), the energy module 26 is electrically isolated from the previous and next energy modules, and the previous and next energy modules are directly coupled via a conductor 427.

Each energy module 26, 28 includes a positive output and a negative output. The fourth section 48 selectively couples the positive output of the first energy module 26 to a negative output of a previous energy module and the negative output to a positive output of a next energy module 28. As noted previously, the fourth section 48 includes a compare circuit 421 that provides a control signal to selectively switch the first switch 422 and the second switch 428. The compare circuit 421 includes a capacitor that is coupled across the output of the module 26. The compare circuit 421 measures the output of the module 26 and compares this output to a predetermined threshold value. If the output of the module 26 is less than the predetermined value, the compare circuit 421 provides a control signal to "swap out" or isolate the module 26. If the output of the module 26 is greater than the predetermined value, the compare circuit 421 provides a control signal to connect that module 26 to the other modules (i.e., the preceding and subsequent modules). As a result, the switching circuit 48 can be employed to "swap out" or isolate an energy module which is either defective or which does not provide a sufficient level of power.

The storage device 20 that is coupled to the energy modules can be a capacitor (e.g., a common filter capacitor) that is in parallel with the battery 16.

2. Embodiment Having Dynamic Tuning of First And Second Sections

In this embodiment, the capacitors in the first and second sections 40 and 42 are replaced with variable capacitors, such as varactors, which can be actively tuned. Each energy module includes a measurement and control (MC) circuit 516, described in greater detail hereinafter, that dynamically (i.e., actively) optimizes the tuning to a particular frequency based upon the module output and a frequency tuning parameter provided by the user.

Figure 5:
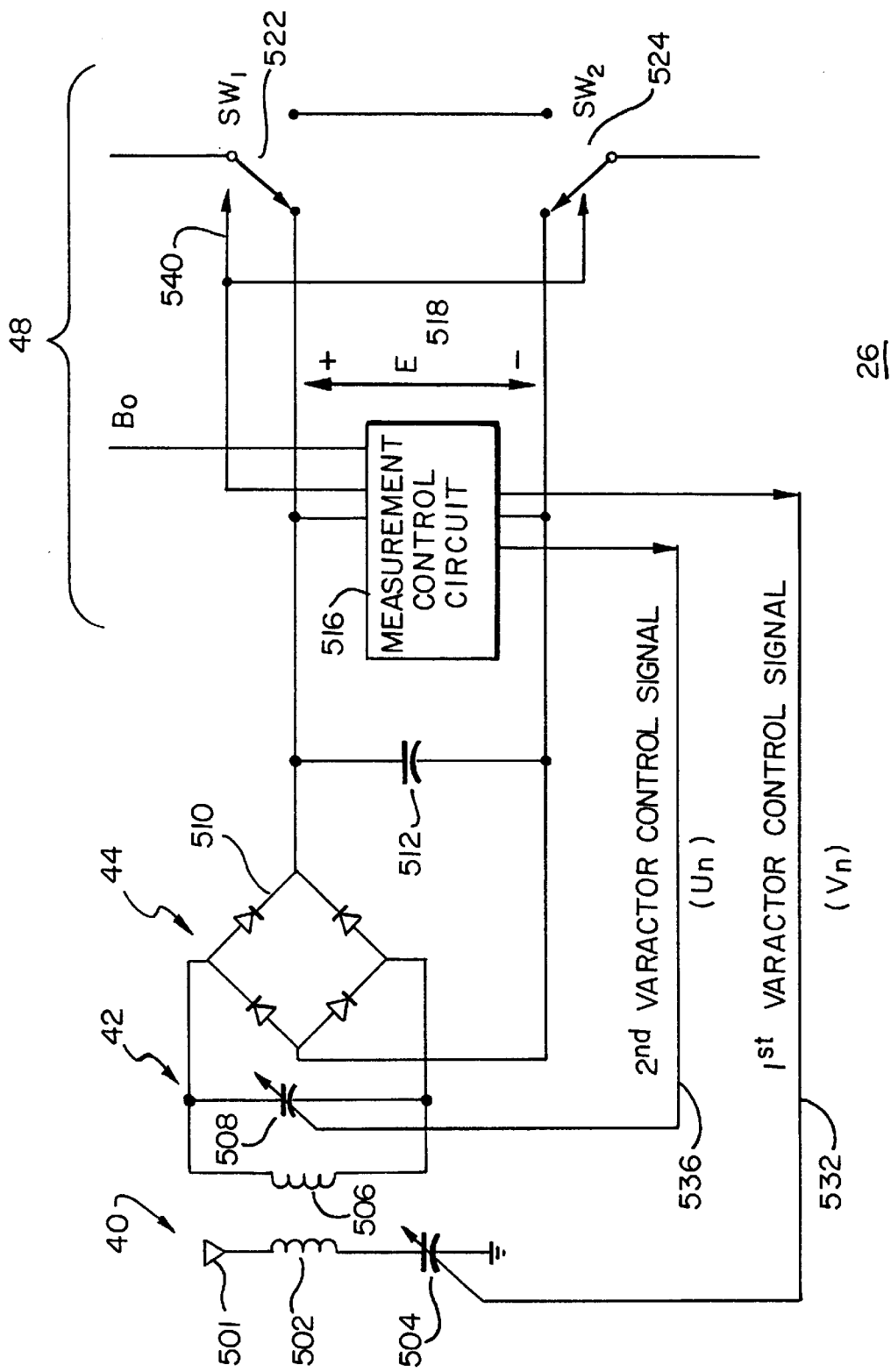
FIG. 5 is a schematic diagram of the first power module of FIG. 3 configured in accordance with an alternative embodiment of the present invention.

FIG. 5 is a schematic diagram of the energy module 26 of FIG. 3 configured in accordance with the dynamic tuning embodiment of the present invention. The first section 40 includes an antenna 501, a first inductor 502, and a first varactor 504 coupled in series. The first varactor 504 includes a first electrode coupled to the first inductor 502, a second electrode coupled to a ground potential, and a third electrode for receiving a first varactor control signal ($v_n$) 532 from the MC circuit 516.

The second section 42 includes a second inductor 506 and a second varactor 508 coupled in parallel. The second varactor includes an electrode for receiving a second varactor control signal ($u_n$) 536 from the MC circuit 516.

The third section 44 is for performing rectification of the output of the second section 42. In the preferred embodiment, a floating full wave rectifier 510 is connected across the parallel LC circuit of the associated second section 42 for rectifying the output voltage of the second section 42.

The fourth section 48 includes a capacitor 512 coupled across the output of the module 26. The fourth section 48 also includes a first switch (SW1) 522 having a first position and a second position, and a second switch (SW2) 524 having a first position and a second position. When the first switch 522 and the second switch 524 are in the first position, the energy module output is in series with the previous and the next energy modules. When the first switch 522 and the second switch 524 are in the second position, the energy module 26 is electrically isolated from the previous and next energy modules.

The fourth section 48 also includes the MC circuit 516 that is in parallel with the capacitor 512. The MC circuit 516 includes an input for receiving an initial frequency tuning parameter ($B_0$) provided by a user. The MC circuit 516 also includes a second input for measuring and receiving the module output voltage (E). In response to the initial frequency tuning parameter (BO), the measured module output voltage (E), and the predetermined varactor parameters and predetermined thresholds, the MC circuit 516 generates the first varactor control signal ($v_n$) 532, the second varactor control signal ($u_n$) 536, and a switch control signal 540 that is applied to switches SW1 522 and SW2 524.

Figure 6:
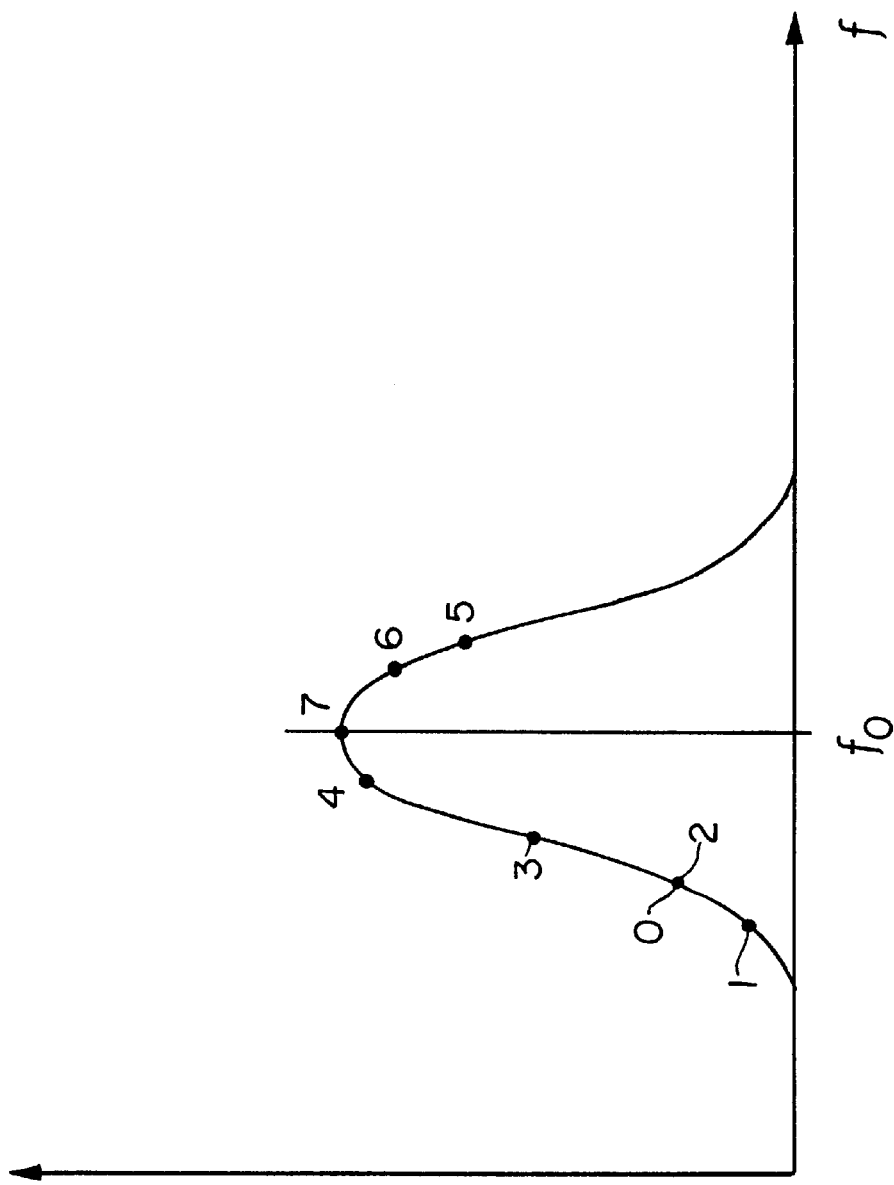
FIG. 6 is an exemplary energy versus frequency graph that illustrates how the embodiment of FIG. 5 tunes to a particular frequency.
Figure 7A:
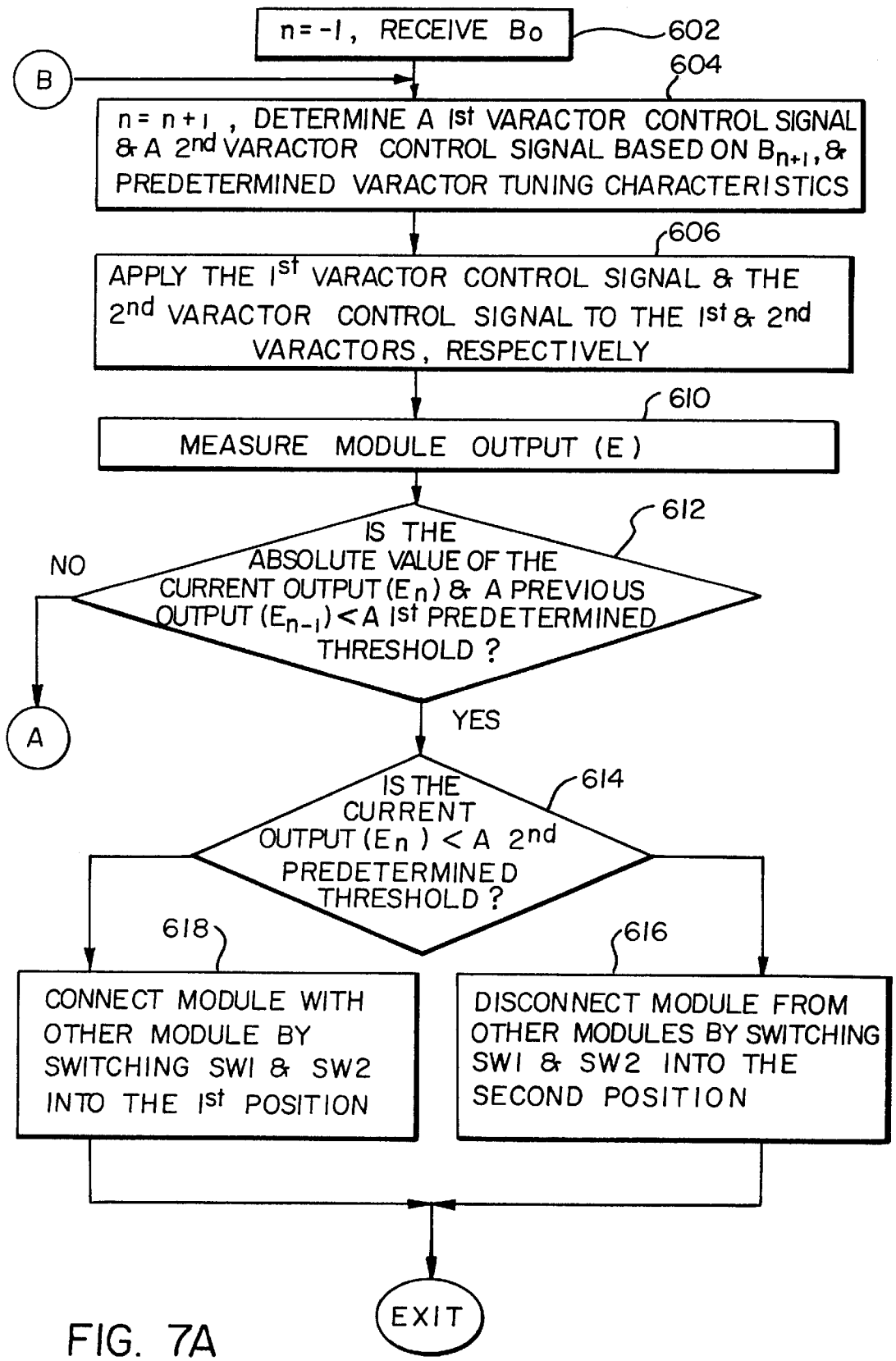
FIGS. 7A and 7B are flowcharts illustrating the steps performed by the measurement and control circuit of FIG. 5.
Figure 7B:
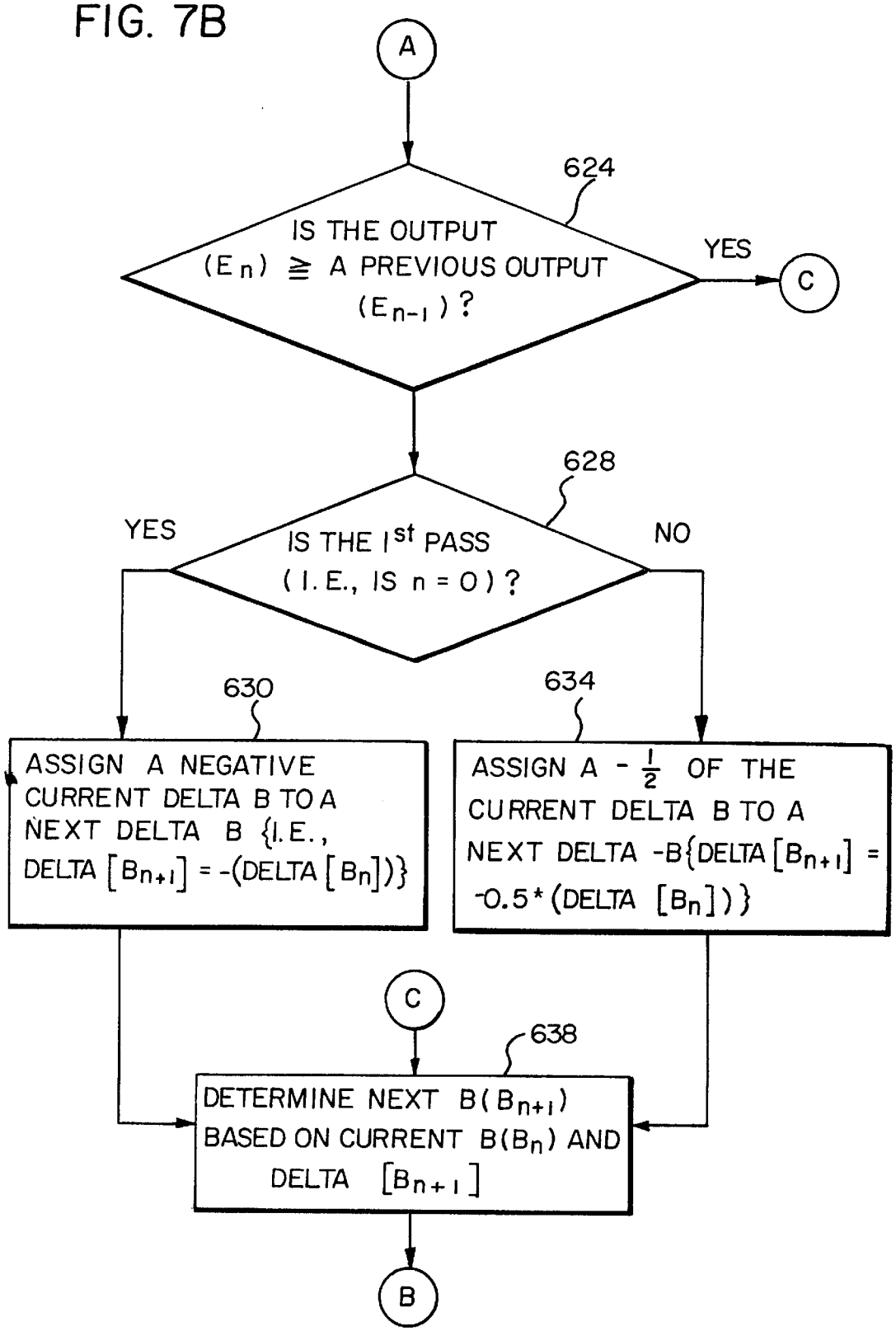

The operation of the MC circuit 516 is described herein with reference to FIGS. 6 and 7. FIG. 6 is an exemplary output voltage (E) versus frequency graph that illustrates how the embodiment of FIG. 5 actively tunes to particular frequency ($f_0$). Initially, the first and second sections 40, 42 are tuned to the vicinity of a desired frequency ($f_0$) by parameter ($B_0$). In response, MC 516 measures the module output voltage (E) and tunes the first and second sections 40, 42 to an operating point denoted, for example, by "0" in FIG. 6. According to step 638 of FIG. 7, the value of B is modified by delta[$B_{n+1}$], which in this case includes a wrong sign, so the first and second sections 40, 42 will be tuned to an operating point denoted by "1" in FIG. 6, which is a lesser frequency. Therefore, according to step 630 of FIG. 7, delta[$B_{n+1}$] is then assigned a negative delta[$B_n$], and the first and second sections 40, 42 are tuned to an operating point denoted by "2", which is the same as starting point "0". According to step 638 of FIG. 7, the first and second sections 40, 42 are then successively tuned to operating points "3", "4" and "5". At operating point "5", the MC circuit 516 detects that the tuning of the first and second sections 40, 42 has passed the peak of the output versus frequency curve, and therefore performs step 634 of FIG. 7. The first and second sections 40, 42 are then tuned to operating points "6" and "7". At point "7", the MC circuit 516 exits the active optimization procedure since the difference between the current module output voltage and a previous module output voltage is less than a predetermined acceptable threshold. In other words, since the difference between the current module output voltage and a previous module output voltage is less than a predetermined acceptable threshold, this means that the frequency $f_0$ is almost at the peak of the output versus frequency curve (i.e., the tuning is optimized).

These steps are illustrated in greater detail in FIG. 7, which is a flowchart illustrating the steps performed by the MC circuit 516 of FIG. 5. In step 602, an initial frequency tuning parameter ($B_0$) is received. For example, a user can employ a calibration chart to determine a suitable initial frequency tuning parameter ($B_0$) for a particular frequency and provide $B_0$ to the MC circuit 516. In step 604, the MC circuit 516 determines a first varactor control signal ($v_{n+1}$) 532 and a second varactor control signal ($u_{n+1}$) 536 based on the frequency tuning parameter ($B_{n+1}$) and predetermined varactor tuning characteristic values (e.g., $a_1$ and $k_1$ for the first varactor 504, and $a_2$ and $k_2$ for the second varactor 508). The predetermined varactor tuning characteristic values describe how the varactors 504, 508 tune in response to a control signal. Specifically, the first and second varactor signals can be calculated by the following equations:

$$u_{n+1} = a_1 + k_1 * B_{n+1} \quad (1)$$

$$v_{n+1} = a_2 + k_2 * B_{n+1} \quad (2)$$

In step 606, the first varactor control signal ($v_{n+1}$) 532 and the second varactor control signal ($u_{n+1}$) 536 are applied to the first varactor 504 and the second varactor 508, respectively. After the capacitances of the varactors 504, 508 are modified, circuit and signal dynamics occur to change the module output voltage (E) across the MC circuit 516. In step 610, the modified module output voltage ($E_n$) is measured by the MC circuit 516. In decision block 612, a determination is made as to whether the current module output voltage ($E_n$) and a previous module output $E_{(n-1)}$ is less than a first predetermined threshold (i.e., is the difference between successive module output voltages sufficiently negligible?). If yes, in decision block 614, a further determination is made whether the current module output voltage ($E_n$) is less than a second predetermined threshold (i.e., is the optimized module output voltage so small that it is not worth utilizing?). If yes, in step 616, the switches SW1, SW2 are switched to the second position, and the module 26 is effectively disconnected from the other modules. If no, in step 618, the switches SW1, SW2 are switched to the first position, and the module 26 is effectively connected in series with the other modules to utilize the module output voltage ($E_n$). The MC circuit 516 exits the active frequency optimization procedure after processing step 616 or step 618.

If the determination in the decision block 612 is no, then in decision block 624, a further determination is made whether the current module output voltage ($E_n$) is greater than or equal to a previous output module voltage $E_{(n-1)}$ (e.g., are we going upwardly along the curve in FIG. 6, for example, from point "1" to point "2"?). If yes, processing proceeds to step 638, which is described in greater detail below. If no, in decision block 628, a further determination is made as to whether n is equal to zero (i.e., whether this is the first pass through the optimization procedure). If yes, in step 630, delta[$B_{n+1}$] is assigned a negative delta[($B_n$)]. If no, in step 634, delta[$B_{n+1}$] is assigned a negative (0.5*delta[$B_n$]) (i.e., cutting the amplitude of delta[$B_n$] into half, such as to go back from point "5" to point "6" in FIG. 6). In step 638, a next frequency tuning parameter ($B_{n+1}$) can be calculated by employing the following equation: $B_{n+1} = B_n +$ delta[$B_{n+1}$]. In other words, the next frequency tuning parameter ($B_{n+1}$) is made to be equal to the current delta[$B_n$] plus the next delta[$B_{n+1}$]. Processing then returns to step 604.

Thus, the procedure illustrated in FIGS. 6 and 7 will be convergent and will seek out the peak of the output versus frequency curve of FIG. 6. In this regard, it is noted that the first and second predetermined thresholds, employed in decision blocks 612 and 614, can be tailored to suit a particular application. It is further noted that the MC circuit 516 can include preprogrammed initial values for delta[$B_n$] of step 630 and delta[$B_{n+1}$] of step 638. Alternatively, it is also possible for these initial values to be provided by the user along with $B_0$ in step 602.

3. Method of the Present Invention

Figure 8:
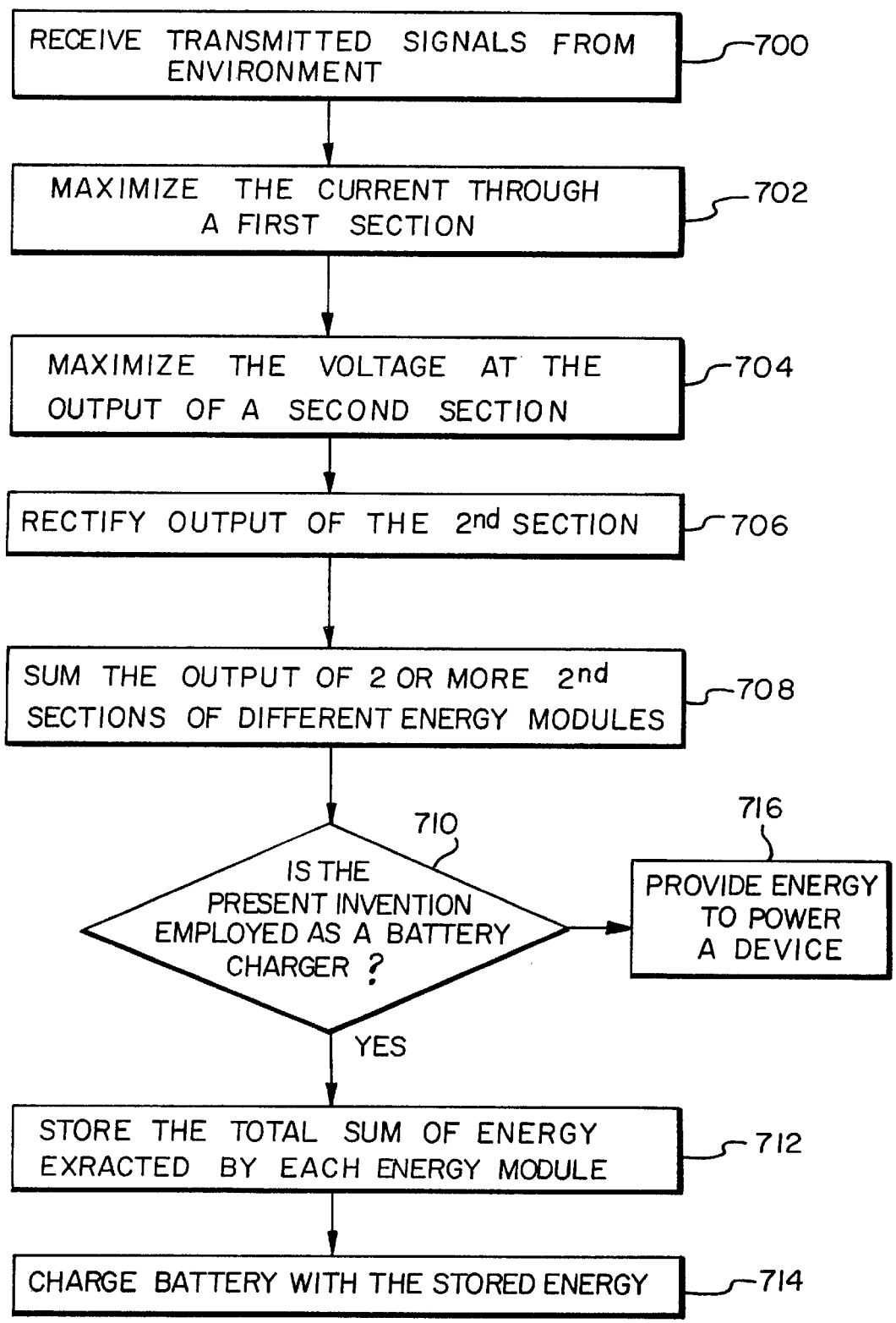
FIG. 8 is a flowchart illustrating the steps performed by the power source of FIGS. 2A and 2B.

FIG. 8 is a flowchart illustrating the steps performed by the power source/battery charger configured in accordance with the embodiment of FIG. 3 of the present invention. In step 700, the power source of the present invention receives transmitted signals from the environment. In step 702, the power source maximizes the current through the first section 40. In step 704, the power source charger maximizes the voltage at the output of the second section 42. In step 706, the power source rectifies the output of the second section 42. In step 708, the power source sums the outputs of two or more energy modules.

At this point, the disposition of the summed energy depends on the application of the present invention. In decision block 710, a determination is made whether the present invention is employed as a battery charger. When used as a battery charger, in step 712, the power source stores the summed energy, and in step 714, the power source charges a rechargeable battery with the stored energy. When used to power a device, in step 716, the power source provides the summed energy to a device to power that device.

The present invention can also be implemented as an auxiliary power supply or as a secondary power supply, which increases the operation time of the electronic device. For example, chargeable batteries can serve as a primary source of power, and the present invention can act as a secondary power supply by charging the batteries, as well as, providing power to the device requiring power.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A battery charger comprising:
    (a) a first terminal for coupling to an anode of a chargeable battery;
    (b) a second terminal for coupling to a cathode of the chargeable battery;
    (c) a storage device coupled to the first and second terminals for storing charge; and
    (d) an environmental energy extractor coupled to the first and second terminals for extracting energy from the environment and for providing the extracted energy to the storage device;
    said environmental energy extractor including an energy module having:
        (i) a first section for receiving an RF signal;
        (ii) a second section, inductively coupled to the first section, for generating an output signal based on the RF signal; and
        (iii) a third section, coupled to the second section, for rectifying the output signal of the second section.

2. The battery charger of claim 1 wherein the environmental energy extractor includes at least two energy modules, each energy module for extracting environmental energy and for providing an extracted energy to the storage device; wherein the energy modules are configured such that the extracted energy provided by each module is summed and the collective extracted energy of all the energy modules is provided to the storage device.

3. The battery charger of claim 2 wherein each energy module is tuned to a predetermined frequency.

4. The battery charger of claim 1 wherein the energy module further includes:
    (a) a compare circuit, coupled across the storage device, for providing a control signal; and
    (b) a switch coupled to receive the control signal and responsive thereto for selectively contributing the extracted energy of that energy module to the collective extracted energy that is provided to the storage device.

5. The battery charger of claim 1 wherein the storage device is a capacitor.

6. The battery charger of claim 1 wherein the first section includes an antenna, an inductor, and a capacitor coupled in series.

7. The battery charger of claim 1 wherein the second section includes an inductor and capacitor coupled in parallel.

8. The battery charger of claim 1 wherein the third section includes a rectifier circuit.

9. The battery charger of claim 8 wherein the rectifier circuit includes a full wave rectifier circuit.

10. The battery charger of claim 1 wherein the first section includes:
    (a) an antenna for receiving RF signals;
    (b) an inductor coupled in series with said antenna; and
    (c) a first varactor coupled in series with the inductor, said varactor having a control node for receiving a first varactor control signal, and a first sense node.

11. The battery charger of claim 10, wherein each energy module includes:
    (a) an energy module output; and
    (b) a measurement and control circuit, coupled to receive the energy module output and an initial frequency tuning parameter, and responsive thereto for generating the first varactor control signal and for providing the first varactor control signal to the first varactor control node.

12. The battery charger of claim 10 wherein the second section further includes:

an inductor, and a second varactor coupled in parallel with said inductor, said second varactor having a control node and a first sense node.

13. The battery charger of claim 12 wherein each energy module includes:

(a) an energy module output; and (b) a measurement and control circuit, coupled to receive the energy module output and an initial frequency tuning parameter, and responsive thereto for generating the second varactor control signal and for providing the second varactor control signal to the second varactor control node.

14. The battery charger of claim 13 wherein the measurement and control circuit generates a control signal, and wherein each energy module further includes a switch coupled to receive the control signal and responsive thereto for selectively contributing the extracted energy of that energy module to the collective extracted energy that is provided to the storage device.

15. The battery charger of claim 1 further comprising a chargeable battery having an anode coupled to the first terminal and a cathode coupled to the second terminal.

16. The battery charger of claim 1 wherein the second section is inductively coupled to the first section.

17. The battery charger of claim 16 wherein the second section is electrically isolated from the first section.

18. In combination:

a device which requires energy for its operation; and a power source coupled to the device, the power source comprising an environmental energy extractor for extracting energy from the environment and for providing the extracted energy to the device, the environmental energy extractor including one or more energy modules, each energy module extracting environmental energy and providing the extracted energy to the device, each energy module including:

(a) a first section for receiving an RF signal;

(b) a second section, electrically isolated from the first section, for generating an output signal based on the RF signal; and (c) a third section, coupled to the second section, for rectifying the output signal of the second section.

19. A battery charger comprising:

(a) a first terminal for coupling to an anode of a chargeable battery;

(b) a second terminal for coupling to a cathode of the chargeable battery;

(c) a storage device coupled to the first and second terminals for storing charge;

(d) an environmental energy extractor coupled to the first and second terminals for extracting energy from the environment and for providing the extracted energy to the storage device;

said environmental energy extractor including at least two energy modules, each energy module extracting environmental energy and providing extracted energy to the storage device, each energy module being dynamically tuned to optimize the energy extracted from the particular energy module.

20. In combination:

a device which requires energy for its operation; and a power source coupled to the device, the power source comprising an environmental energy extractor for extracting energy from the environment and providing the extracted energy to the device, the environmental energy extractor including one or more energy modules, each energy module extracting environmental energy and providing the extracted energy to the device, each energy module being dynamically tuned to optimize the energy extracted from the particular energy module.

21. In combination:

a device which requires energy for its operation; and a power source coupled to the device, the power source comprising an environmental energy extractor for extracting energy from the environment and for providing the extracted energy to the device, the environmental energy extractor including at least two energy modules, each module for extracting environmental energy and for providing the extracted energy to the device, each energy module including:

(a) a first section for receiving an RF signal;

(b) a second section, inductively coupled to the first section, for generating an output signal based on the RF signal; and (c) a third section, coupled to the second section, for rectifying the output signal of the second section.

22. The combination of claim 21 further comprising means for coupling the power source to the device.

23. The combination of claim 20, wherein the energy modules are configured such that the extracted energy provided by the energy modules are summed and the collective extracted energy of all the energy of the modules is provided to the device.

24. The combination of claim 21 wherein each energy module further includes:

(a) a compare circuit, coupled across the device, for providing a control signal; and (b) a switch coupled to receive the control signal and responsive thereto for selectively contributing the extracted energy of that energy module to the collective extracted energy that is provided to the device.

25. The combination of claim 21 further comprising a storage device coupled across the device.

26. The combination of claim 25 wherein the storage device is a capacitor.

27. The combination of claim 21 wherein the first section includes an antenna, an inductor, and a capacitor coupled in series.

28. The combination of claim 21 wherein the second section includes an inductor and capacitor coupled in parallel.

29. The combination of claim 21 wherein the third section includes a rectifier circuit.

30. The combination of claim 29 wherein the rectifier circuit includes a full wave rectifier circuit.

31. The combination of claim 21 wherein the first section includes:

(a) an antenna for receiving RF signals;

(b) an inductor coupled in series with said antenna; and (c) a first varactor coupled in series with the inductor, said varactor having a control node for receiving a first varactor control signal, and a first sense node.

32. The combination of claim 31, wherein each energy module includes:

(a) an energy module output; and (b) a measurement and control circuit, coupled to receive the energy module output and an initial frequency tuning parameter, and responsive thereto for generating the first varactor control signal and for providing the first varactor control signal to the first varactor control node.

33. The combination of claim 31 wherein the second section further includes:

(a) an inductor; and (b) a second varactor coupled in parallel with said inductor, said second varactor having a control node and a first sense node.

34. The combination of claim 33 wherein each energy module includes:

(a) an energy module output; and (b) a measurement and control circuit, coupled to receive the energy module output and an initial frequency tuning parameter, and responsive thereto for generating the second varactor control signal and for providing the second varactor control signal to the second varactor control node.

35. The combination of claim 34 wherein the measurement and control circuit generates a control signal, and wherein each energy module further includes a switch coupled to receive the control signal and responsive thereto for selectively contributing the extracted energy of that energy module to the collective extracted energy that is provided to the device.

36. The combination of claim 21 wherein each energy module is tuned to a predetermined frequency.

37. A method of extracting energy from the environment, and providing the extracted energy to a device, comprising the steps of:

(a) providing an energy module having a first section having a current path and a second section having an output;

(b) receiving radio frequency (RF) signals;

(c) maximizing a current through the current path of the first section;

(d) maximizing the output in the second section; and (e) rectifying the output of the second section.

38. The method of claim 37, wherein step (a) further includes the step of inductively coupling the second section to the first section.

39. The method of claim 38, wherein step (a) further includes the step of electrically isolating the second section from the first section.

40. The method of claim 37, further including the following steps:

(f) providing a second energy module having a first section having a current path and a second section having an output;

(g) receiving radio frequency (RF) signals at the second energy module;

(h) maximizing a current through the current path of the first section of the second energy module;

(i) maximizing the output in the second section of the second energy module;

(j) rectifying the output of the second section of the second energy module; and (k) summing the outputs of the energy module and second energy module.

41. The method of claim 37, further including the following step:

(f) providing the rectified output to a storage device which is part of a battery charger.

42. The method of claim 37, further including the following step:

(f) providing the rectified output to a device which requires energy for its operation.

43. The method of claim 37, further including the following step:

(f) responsive to the rectified output, controlling a switch to either isolate the energy module or to connect the energy module to a series of other energy modules.

44. The method of claim 37, wherein step (a) further includes the step of pre-tuning the energy module to a predetermined frequency.

45. The method of claim 37, further including the following step:

(f) providing frequency tuning parameters to the energy module;

(g) optimizing a particular frequency based on the rectified output and the parameters.

* * * * *